May 7, 1940.　　　　　G. O. KRUGER　　　　　2,200,179
FORK
Filed Jan. 12, 1939
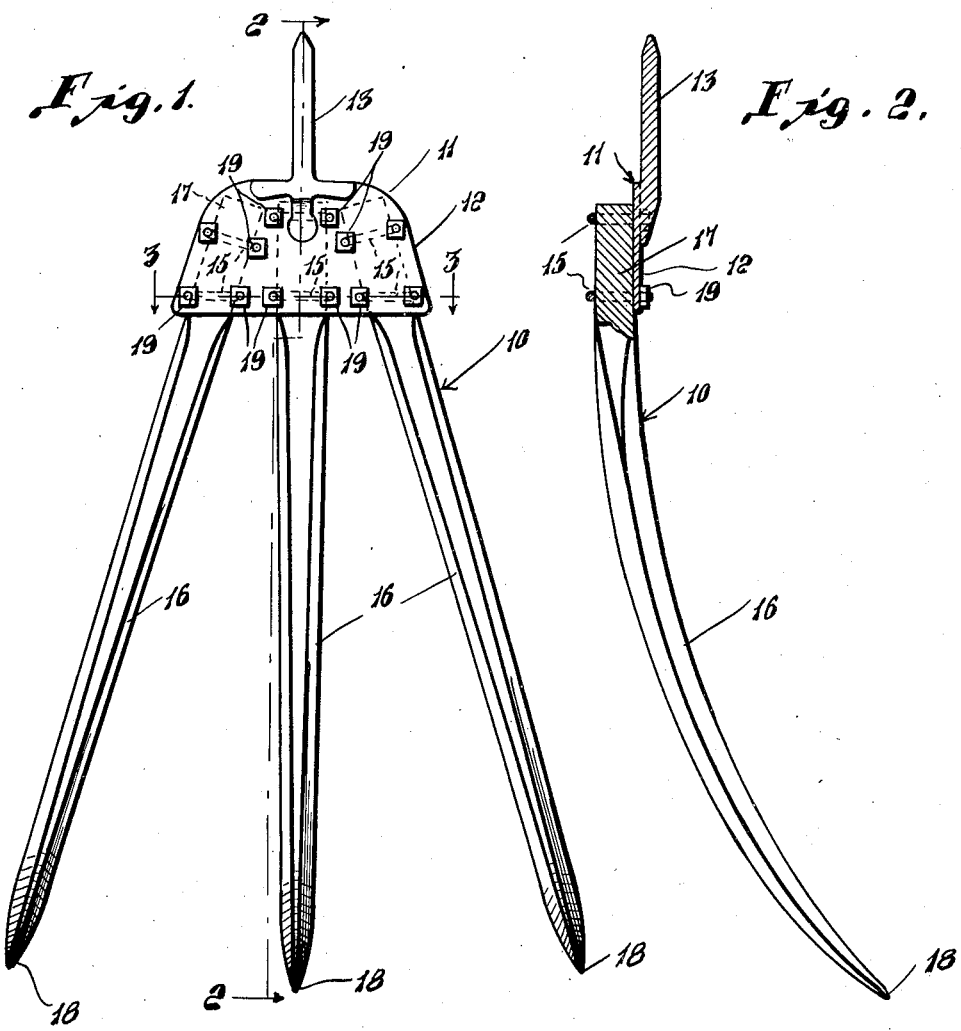
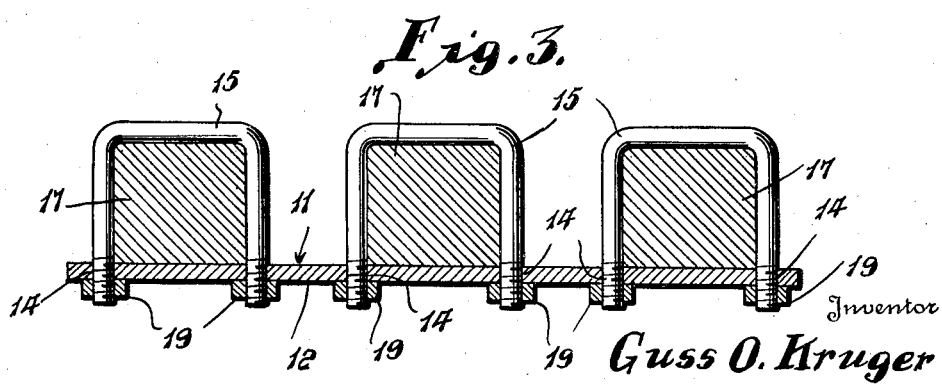
Inventor
Guss O. Kruger
By L. F. Randolph
Attorney

Patented May 7, 1940

2,200,179

UNITED STATES PATENT OFFICE 2,200,179

FORK

Guss O. Kruger, Madison, S. Dak.

Application January 12, 1939, Serial No. 250,645

1 Claim. (Cl. 294—49)

This invention relates to an improved pitchfork for handling various types of grain bundles and particularly adapted for handling corn stalks.

It is a primary object of this invention to provide a fork having tines made of wood which will not pierce the individual stalks of a bundle when inserted therein so that the bundle when lifted may readily be released and will not cling to the tines.

Still another aim of the invention is to provide a pitchfork provided with a head having clamping means for removably mounting a plurality of tines and for properly spacing them relatively to each other whereby said tines may be quickly and readily detached and replaced when necessary.

Other objects and advantages of the invention will hereinafter become more fully apparent from the following description of the drawing, which illustrates a preferred embodiment thereof, and wherein:

Figure 1 is a front elevational view of a fork constructed in accordance with the invention, Figure 2 is a longitudinal vertical sectional view taken along the line 2—2 of Figure 1, and Figure 3 is a horizontal sectional view taken along the line 3—3 of Figure 1.

Referring more particularly to the drawing, wherein like reference characters designate like or corresponding parts throughout the different views, 10 designates generally the fork which is adapted to be provided with a conventional handle, not shown.

The fork 10 includes the head 11 formed of a plate 12 and the reduced shank 13 which projects upwardly therefrom and from its front side and adjacent its upper edge which is adapted to be suitably secured in a handle, not shown. The plate 12 is provided with a number of pairs of openings 14 through which extend the threaded ends of the U-shaped clamping members 15, which are disposed on the back side of the plate with their threaded ends projecting through the front side thereof.

The tines of the fork 10, designated generally 16, have the corresponding rectangular ends or shanks 17. Tines 16 taper from their ends 17 to their ends 18 which are substantially pointed and from adjacent their ends 17 to their ends 18 the tines are preferably hexagonal in cross section. The tines 16 taper gradually to a point adjacent the ends 18 where they begin to taper more sharply to form ends 18 so that said ends will be relatively thick.

The shanks 17 are adapted to be disposed on the back side of the plate 12 with each of the shanks engaged by two of the U-shaped clamping members 15 which are then tightened by means of the nuts 19, which engage their threaded ends and which abut the outer side of the plate 12 to draw the clamps 15 into frictional engagement with shanks 17 to hold said shanks between the intermediate portions of the clamps and the back side of the plate 12. Two of the clamps 15 hold each of the tines 16 and these pairs of clamps are so arranged relatively to the plate 12, as illustrated in Figure 1, that the outer tines are clamped obliquely to the center tine so that the three tines diverge outwardly toward their free ends 18.

Tines 16 are preferably formed of wood and are of sufficient thickness so that their ends 18 cannot pierce the individual stalks of a bundle but may readily be inserted into a bundle between the stalks so that the bundle when raised may readily be released from the fork and will not cling to it as is frequently the case with tines made of metal which readily pierce the individual stalks so that when a bundle is raised above the head to be released it clings to the fork and is brought down again with it. Also, clamping members 15 are sufficiently spaced from each other so that they may be individually loosened for selectively releasing one of the tines 16 in order that it may be detached and replaced if broken or otherwise damaged.

Various modifications and changes in the particular construction and arrangement of the parts forming the invention are contemplated and may be resorted to, and the right is reserved to make such variations and changes as fall within the spirit and scope of the invention as hereinafter defined by the appended claim.

I claim as my invention:

A pitchfork comprising a head including a flat base portion provided with a plurality of pairs of apertures, the pairs of apertures being spaced relatively to each other, said base having an integral shank for connecting with a handle, U-bolts having threaded ends extending through the apertures of said pairs from the underside of the base and provided with nuts disposed on the upper side of the base; a plurality of wooden tines having shank portions disposed on the underside of the base, each of said shank portions being engaged and clamped to the base by two of the U-bolts, said U-bolts being arranged, relatively to the base, for disposing said tines in outwardly diverging relationship relatively to each other, and each of said tines tapering gradually from its shank portion to adjacent its free end and sharply therefrom to its terminal to provide a pointed end.

GUSS O. KRUGER.